2,857,363

CATALYTIC PRODUCTION OF POLYETHYLENE TEREPHTHALATE

William K. Easley, Julian K. Lawson, and James B. Ballentine, Decatur, Ala., assignors to The Chemstrand Corporation, Decatur, Ala., a corporation of Delaware No Drawing. Application August 1, 1955
Serial No. 525,784

10 Claims. (Cl. 260—75)

This invention relates to an improvement method for preparing a synthetic linear polyester such as the condensation product of a polyhydric alcohol and a dibasic acid. More particularly, the invention is concerned with an improved method for the preparation of polyethylene terephthalate.

Synthetic linear condensation polyesters derived from glycols and dibasic acids, which are capable of being drawn into pliable, strong fibers showing, by characteristic X-ray patterns, orientation along the fiber axis are well-known. Having such properties these polyesters have proved to be of considerable value commercially, and particularly is this true of those polyesters formed from terephthalic acid and a glycol of the series $$HO(CH_2)_nOH$$

where $n$ is an integer from two to ten inclusive. One of the most attractive polyesters or polymers of this class is polyethylene terephthalate. One of the best methods of producing polyethylene terephthalate involves an ester interchange between ethylene glycol and dimethyl terephthalate to form bis-2-hydroxyethyl terephthalate monomer which is then polymerized to polyethylene terephthalate under reduced pressure and at elevated temperatures.

However, difficulties have been encountered in the manufacture of polyethylene terephthalate by the ester interchange reaction. Obviously, highly purified dimethyl terephthalate and highly purified glycol are preferred starting materials in order to form a uniform high quality product. It has been noted, however, that even these highly purified materials are very sluggish with respect to ester interchange and in the case of less purified reagents the reaction is still too slow for practical commercial operation. Because of this slow rate of reaction, it has been found to be essential, in commercial operation, to employ a suitable catalyst to speed up the reaction.

Many catalysts have heretofore been proposed for the ester interchange reaction in the manufacture of polyethylene terephthalate. These catalysts have not proved to be entirely satisfactory, since many of the known catalysts are not capable of producing condensation polymers having a sufficiently high molecular weight within a commercially feasible period of time. Likewise, many of the proposed catalysts are not soluble in the polymerization mixture during all stages of the polymerization, but become insoluble after the polymerization has progressed to relatively high molecular weights. Therefore, there has been a great desire in the art to find an ester interchange catalyst which not only speeds up the reaction into the realm of that considered necessary for economic purposes and which is soluble over approximately the entire range of molecular weights desired in the finished polymer, but also, a catalyst which produces a condensation polymer of good color.

Accordingly, it is a primary purpose of the present invention to provide a new and improved process for producing polyethylene terephthalate which overcomes the disadvantages of prior art processes, pointed out hereinbefore, and produces a product of improved properties, particularly improved color in the condensation polymer, and in articles produced therefrom.

It is another object of the invention to provide a new class of catalysts which accelerates ester interchange reaction between ethylene glycol and dimethyl terephthalate.

It is a further object of the invention to provide a new class of catalysts which is soluble in the polymerization mixture over the entire range of molecular weights desired. It is a still further object of the invention to improve the reactions involved in the production of fiber- and filament-forming linear condensation polyesters formed from ethylene glycol and dimethyl terephthalate with respect to accelerating the same by means of new catalysts. Other objects and advantages of the invention will be apparent from the description thereof hereinafter.

In general, the objects of the present invention are accomplished by conducting the ester interchange between ethylene glycol and dimethyl terephthalate, and the subsequent polymerization of the resulting bis-2-hydroxyethyl terephthalate, in the presence of catalytic amounts of a metal enolate of a diketone containing from five to eight carbon atoms and having the carbonyl groups separated by one carbon atom. Suitable metal enolates are those of cadmium, cobalt, manganese, magnesium, and zinc. As examples of suitable catalysts there may be named zinc acetylacetonate, the zinc enolate of 2,4-hexanedione, the zinc enolate of 3,5-heptanedione, the zinc enolate of 3,5-octanedione, manganous acetylacetonate, the manganous enolate of 2,4-hexanedione, the manganous enolate of 3,5-heptanedione, the manganous enolate of 3,5-octanedione, cadmium acetylacetonate, the cadmium enolate of 2,4-hexanedione, the cadmium enolate of 3,5-heptanedione, the cadmium enolate of 3,5-octanedione, cobaltous acetylacetonate, the cobaltous enolate of 2,4-hexanedione, the cobaltous enolate of 3,5-heptanedione, the cobaltous enolate of 3,5-octanedione, magnesium acetylacetonate, the magnesium enolate of 2,4-hexanedione, the magnesium enolate of 3,5-heptanedione, and the magnesium enolate of 3,5-octanedione.

In the preparation of polyethylene terephthalate by means of the ester interchange reaction, the method comprises two steps. In the first step, ethylene glycol and dimethyl terephthalate are reacted at elevated temperatures and atmospheric pressure to form methanol, which is removed, and bis-2-hydroxyethyl terephthalate monomer. Thereafter, in the second step, the monomer is heated at still higher temperatures and under reduced pressure to form the polyethylene terephthalate with the elimination of glycol, which is readily volatilized under these conditions and removed from the system. The second, or polymerization, step is continued until a fiber-forming polymer having the desired degree of polymerization, determined by intrinsic viscosity, is obtained. Without the aid of a suitable catalyst, the above reactions do not proceed at a noticeable rate.

The present invention proposes conducting both steps of the above-identified reaction in the presence of catalytic amounts of one of the catalysts named hereinbefore. A reasonably wide range of catalyst concentration may be employed, for example, .001 to 2.0 percent by weight, based on the weight of the dimethyl terephthalate. However, it is preferred to employ the catalyst in the range of .01 to 2.0 percent by weight.

During the first stage, or initial condensation, a simple ester interchange takes place with the formation of bis-2-hydroxyethyl terephthalate. This portion of the reaction is carried out at atmospheric pressure and at a temperature in the range of 100 to 250° C. and preferably between 150 and 220° C. If desired, the reaction may be carried out at pressure above or below atmospheric but it is preferred to employ atmospheric pressure. During this first stage, methanol is evolved which is continually removed by distillation. At the completion of the first stage, the excess glycol, if any, is distilled off, prior to entering the second stage of the reaction.

The second stage, or polymerization stage, is conducted at reduced pressures. For optimum results, a pressure within a range of 0.1 to 5 mm. of mercury is used. This reduced pressure is necessary to remove the free ethylene glycol which is formed during this stage of the reaction. The ethylene glycol is volatilized under these conditions and removed from the system. The polymerization step is conducted at a temperature within the range of 220 to 300° C. The lower the temperature the longer time to effect complete reaction. Further, it is desirable to maintain a nitrogen blanket over the reactants in order to prevent oxidation, said nitrogen containing less than 0.003 percent oxygen.

The polymerization step, or second stage, may be effected either in the liquid or melt phase or in the solid phase. In the liquid phase especially, reduced pressures must be employed in order to remove the free ethylene glycol which emerges from the polymer as a result of the condensation reaction.

When employing the procedures heretofore known in the art, the ester interchange portion of the reaction, or first step, has taken place in approximately three to six hours. However, when employing the process of the present invention, using the new catalysts enumerated herein, the ester interchange takes place in 0.5 to 1.5 hours. Likewise, the polymerization, or second step, has heretofore taken place in approximately one to ten hours depending on catalyst concentration, temperature, intrinsic viscosity desired, amount of color allowable in the finished polymer, etc. With the present process the second step takes place in approximately 0.5 to 4 hours when employing the catalyst and conditions recited hereinbefore.

The linear condensation polyesters, produced in accordance with the present invention, have a specific viscosity of approximately 0.1 to 1.0. This represents fiber- and filament-forming polymers. It is to be understood, of course, that non-fiber-forming polyesters may be produced by means of the present invention, which have a greater or less specific viscosity than that reiterated above.

Specific viscosity of the polymer, as referred to herein, refers to the relative viscosity minus one. Relative viscosity of the polymer is determined by measuring the viscosity in seconds of a 0.5 percent solution of the polymer and dividing by the viscosity in seconds of the solvent at the same temperature, i. e., 25° C. A suitable solvent for the polyesters is a mixture of two parts by weight phenol with one part by weight 2,4,6-trichlorophenol, the mixture containing 0.5 percent distilled water.

To further illustrate the present invention and the advantages thereof the following examples are given, it being understood that these are merely intended to be illustrative and not limitative. Unless otherwise indicated, all parts and percents are by weight.

In each of the Examples 1 to 7 the following procedure was employed: 41 parts of dimethyl terephthalate, 49 parts of ethylene glycol and an amount of catalyst as indicated in Table I below, were placed in a vessel fitted with a distilling column and heated to about 177° C. for a period of 90 minutes at atmospheric pressure. During this period methanol from the ester interchange reaction was distilled off and collected. Pure nitrogen (containing less than 0.003 percent oxygen) was bled into the reaction mixture at all times. After the initial 90 minute period, the temperature of the reaction mixture was increased to about 285° C. and the system placed under a vacuum with less than 1 mm. pressure. The polymerization was allowed to proceed at this temperature for 180 minutes to form a polymer in the fiber-forming range. The ethylene glycol formed as a result of the polymerization was distilled off and collected. Upon cooling the polymers formed, the relative and specific viscosities were determined. The results are set forth in Table I below.

*Table I*

| Example | Percent Catalyst (Based on wt. of dimethyl terephthalate) | Specific Viscosity | Polymer Color |
|---|---|---|---|
| 1 | 0.05% Manganous Acetylacetonate | 0.388 | White. |
| 2 | 0.09% Manganous Acetylacetonate | 0.392 | White. |
| 3 | 0.05% Zinc Acetylacetonate | 0.383 | White. |
| 4 | 0.09% Zinc Acetylacetonate | 0.376 | White. |
| 5 | 0.09% Cobaltous Acetylacetonate | 0.304 | Bluish Gray. |
| 6 | 0.1% Cadmium Acetylacetonate | 0.359 | Light Amber. |
| 7 | 0.09% Magnesium Acetylacetonate | 0.310 | White. |

From the above examples it can be seen that all the polyesters produced had good color, and, in addition, fibers and filaments produced from the polyesters had the same good color. It has also been noted that the specific viscosity will increase with the increased purity of catalyst employed.

Similar beneficial results are obtained when employing the same metal enolates of the other diketones mentioned, such as the those of 2,4-hexanedione, 3,5-heptanedione, and 3,5-octanedione, and when the same general procedure as outlined above is employed. While all of the metal enolates of the diketones described are satisfactory for the purposes of the instant invention, it is preferred to employ the zinc and manganous enolates since they are more reactive than the other metal enolates. That is, it is possible to employ smaller amounts of the zinc and manganous enolates and still obtain the desirable specific viscosity and good color, which is essential in the formation of fibers and filaments.

The catalysts of the present invention are more reactive than those of the prior art. The methanol is released almost immediately during the first stage of the reaction when employing the instant catalysts. Furthermore, higher specific viscosities are obtainable when employing the catalysts of the instant invention than has heretofore been possible with prior art catalysts under the same conditions. These factors are indicative of increased catalyst activity in both stages of the reaction.

The increased activity of the instant catalysts is in part due to the fact that they are soluble in the reaction mixture at all stages of the polymerization reaction, whereas some of the prior art catalysts, for example, zinc borate, are not readily soluble and tend to build up activity as they dissolve. Likewise, such catalysts as antimony oxide and litharge, proposed heretofore, become insoluble during the latter stages of the polymerization under the conditions described. These factors affect the color of the finished product since the longer the reaction mass is submitted to high temperatures, the more likely it is that discoloration of the polymer and articles produced therefrom will result.

As pointed out hereinbefore when employing the new catalysts of the present invention in producing polyethylene terephthalate by means of the ester interchange reaction, it is possible to produce polymerization products having improved color and articles, such as fibers and filaments, produced therefrom likewise have improved color, i. e., they are whiter than articles produced heretofore by prior art procedures.

This is an important advantage, and in fact, a very critical factor, since in the textile industry there is an extremely great desire for a fiber or yarn that can be colored or dyed as desired. When a yarn is off-color when spun, it necessitates an additional bleaching step and further, off-color shades will result when such material is dyed, since the material being dyed is off-color.

The new catalysts described herein may be employed in admixture with other known catalysts for the ester interchange between ethylene glycol and dimethyl terephthalate or for the subsequent polymerization of the resulting bis-2-hydroxyethyl terephthalate. They may be employed in either the first, ester interchange stage and an additional catalysts added for the second polymerization stage, or a different catalyst may be used in the ester interchange stage and the catalysts of the present invention added before the polymerization stage. Alternatively, the new catalysts and other known catalysts may be admixed and employed throughout both stages of the complete reaction.

The catalysts of the present invention are not affected by the amounts of water that are normally present during esterification, i. e., the water which is normally present in ethylene glycol. This contributes to the superior color of the finished product. Due to the fact that the present catalysts are not affected by the amounts of water normally present during esterification, there is faster reactivity during the first stage which also contributes to better color. Numerous other advantages of the instant invention will be apparent to those skilled in the art.

It is to be understood that changes and variations may be made in the present invention without departing from the spirit and scope thereof as defined in the appended claims.

We claim:

1. A process for producing polyethylene terephthalate comprising reacting ethylene glycol and dimethyl terephthalate in the presence of a catalytic amount of a metal enolate of an aliphatic diketone containing from five to eight carbon atoms and having the carbonyl groups separated by one carbon atom, said metal being selected from the group consisting of cadmium, cobalt, manganese, magnesium, and zinc, at elevated temperatures until no further methanol is liberated, and then continuing the reaction in the presence of said catalyst at elevated temperatures and reduced pressure until a linear polyester having the desired degree of polymerization is obtained.

2. A process for producing polyethylene terephthalate comprising reacting ethylene glycol and dimethyl terephthalate in the presence of a catalytic amount of a metal enolate of an aliphatic diketone containing from five to eight carbon atoms and having the carbonyl groups separated by one carbon atom, said metal being selected from the group consisting of cadmium, cobalt, manganese, magnesium, and zinc, at a temperature in the range of 100 to 250° C. until no further methanol is liberated, and then continuing the reaction in the presence of said catalyst at a temperature in the range of 220 to 300° C. and a pressure of 0.1 to 5 mm. of mercury until a linear polyester having the desired degree of polymerization is obtained.

3. The process as defined in claim 2 wherein there is employed from 0.001 to 2.0 percent by weight of the catalyst based on the weight of dimethyl terephthalate.

4. The process as defined in claim 3 wherein the catalyst is zinc acetylacetonate.

5. The process as defined in claim 3 wherein the catalyst is manganese acetylacetonate.

6. The process as defined in claim 3 wherein the catalyst is cadmium acetylacetonate.

7. The process as defined in claim 3 wherein the catalyst is cobaltous acetylacetonate.

8. The process as defined in claim 3 wherein the catalyst is magnesium acetylacetonate.

9. In a process for producing polyethylene terephthalate wherein ethylene glycol and dimethyl terephthalate are reacted to form bis-2-hydroxyethyl terephthalate which is thereafter polymerized to produce polyethylene terephthalate, the steps comprising polymerizing bis-2-hydroxyethyl terephthalate in the presence of a catalytic amount of a metal enolate of an aliphatic diketone containing from five to eight carbon atoms and having the carbonyl groups separated by one carbon atom, said metal being selected from the group consisting of cadmium, cobalt, manganese, magnesium, and zinc, at a temperature in the range of 220 to 300° C. and a pressure of 0.1 to 5 mm. of mercury until a linear polyester having the desired degree of polymerization is obtained.

10. In a process for producing polyethylene terephthalate wherein ethylene glycol and dimethyl terephthalate are reacted to form bis-2-hydroxyethyl terephthalate which is thereafter polymerized to produce polyethylene terephthalate, the steps comprising reacting ethylene glycol and dimethyl terephthalate in the presence of a catalytic amount of a metal enolate of an aliphatic diketone containing from five to eight carbon atoms and having the carbonyl groups separated by one carbon atom, said metal being selected from the group consisting of cadmium, cobalt, manganese, magnesium, and zinc, at a temperature in the range of 100 to 250° C. until no further methanol is liberated.

References Cited in the file of this patent

UNITED STATES PATENTS 2,465,319    Whinfield et al. _____ Mar. 29, 1949